Aug. 11, 1942.  C. STEENSTRUP  2,292,803
EVAPORATOR FOR REFRIGERATING MACHINES
Filed April 17, 1937   2 Sheets-Sheet 1
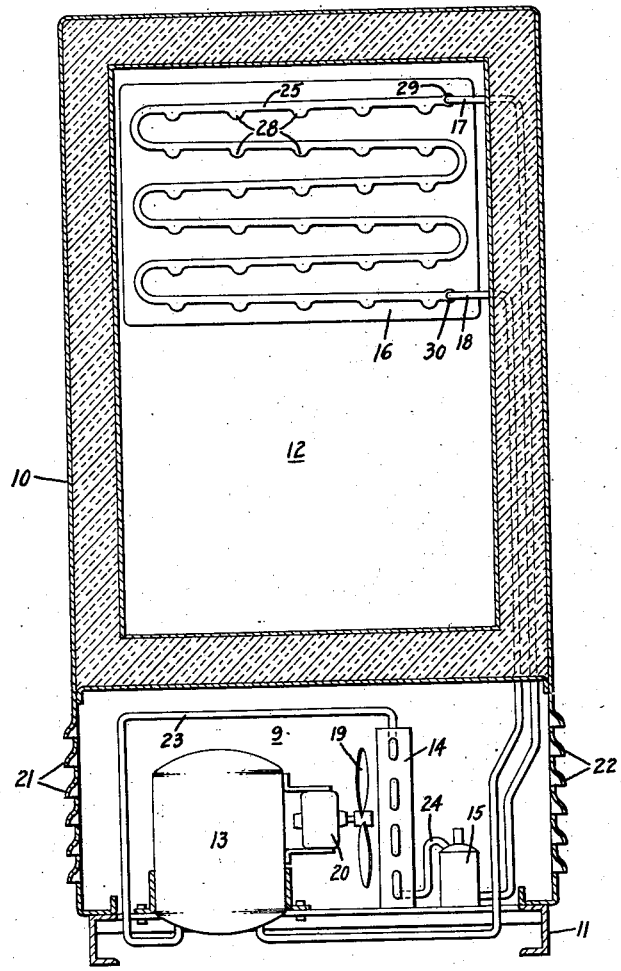
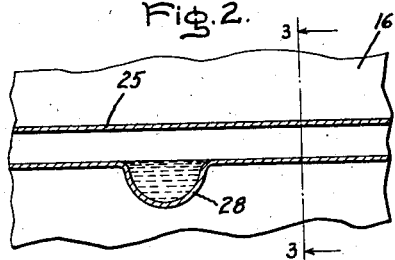
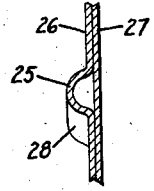
Inventor:
Christian Steenstrup,
by Harry E. Dunham
His Attorney.

Aug. 11, 1942. C. STEENSTRUP 2,292,803
EVAPORATOR FOR REFRIGERATING MACHINES
Filed April 17, 1937 2 Sheets-Sheet 2

Inventor:
Christian Steenstrup,
by Harry E. Dunham
His Attorney.

UNITED STATES PATENT OFFICE 2,292,803

EVAPORATOR FOR REFRIGERATING MACHINES

Christian Steenstrup, Schenectady, N. Y., assignor to General Electric Company, a corporation of New York Application April 17, 1937, Serial No. 137,521

4 Claims. (Cl. 62—126)

My invention relates to evaporators for refrigerating machines.

It is an object of my invention to provide an evaporator for refrigerating machines which is provided with a refrigerant circulating conduit and an arrangement whereby liquid refrigerant may be trapped and maintained distributed along the length of said conduit to provide substantially uniform heat absorbing capacity throughout the length of the conduit without the necessity of maintaining the conduit completely flooded with liquid refrigerant.

Further objects and advantages of my invention will become apparent as the following description proceeds, and the features of novelty which characterize my invention will be pointed out with particularity in the claims annexed to and forming a part of this specification.

Figure 4:
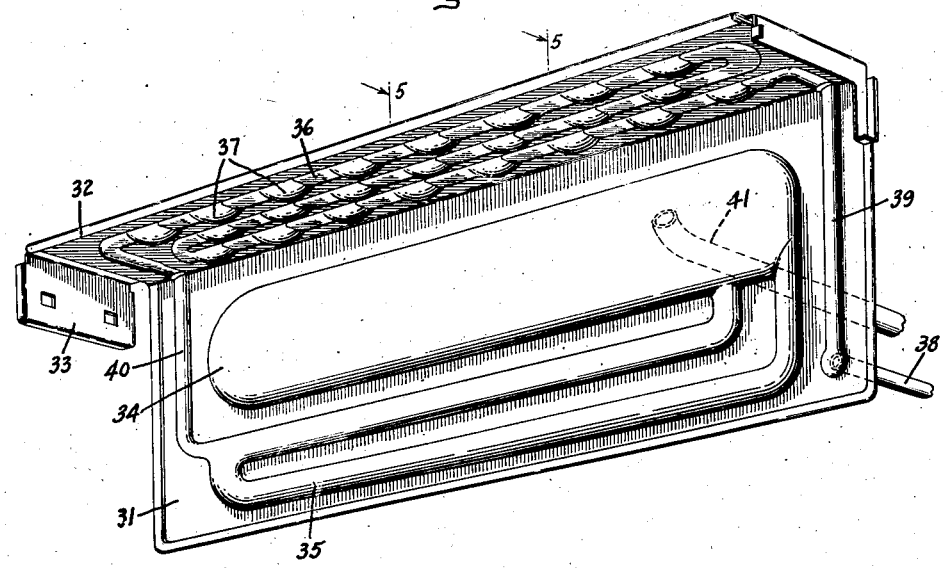
Figure 5:
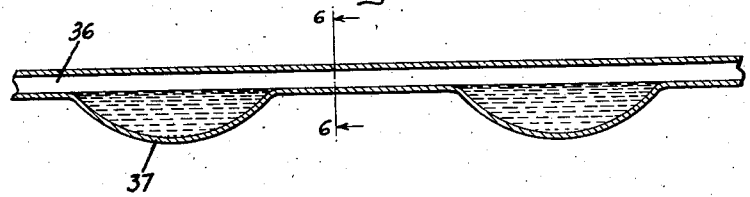
Figure 6:
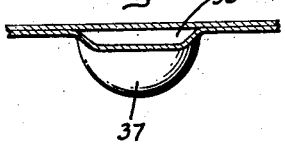

For a better understanding of my invention, reference may be had to the accompanying drawings in which Fig. 1 is a front sectional elevational view of a household refrigerator provided with an evaporator embodying my invention. Fig. 2 is an enlarged sectional view of a portion of the evaporator shown in Fig. 1; Fig. 3 is a sectional view taken along the line 3—3 of Fig. 2; Fig. 4 is a perspective view of another embodiment of my invention; Fig. 5 is an enlarged sectional view along the line 5—5 of Fig. 4; and Fig. 6 is a sectional view along the line 6—6 of Fig. 5.

Referring now to the drawings, in Fig. 1 I have shown a household refrigerating machine comprising a thermally insulated cabinet 10 mounted on a metal stand 11 and provided with a food storage compartment 12. In a compartment 9 below the cabinet is arranged a refrigerating machine comprising a motor and compressor casing 13, a condenser 14 and a liquid receiver or float valve chamber 15. Within the food storage compartment 12 is mounted an evaporator 16 which is connected in the refrigerant circuit of the refrigerating machine by inlet and outlet refrigerant lines 17 and 18 respectively. The condenser 14 and the casing 13 are cooled by the circulation of air produced by operation of a fan 19 driven by a motor 20 secured to the casing 13, the air entering the compartment 9 through louvers 21 and being discharged therefrom through louvers 22.

During the operation of the refrigerating machine gaseous refrigerant is compressed by operation of the compressor within casing 13 and is discharged through a conduit 23 into the condenser 14. The compressed gaseous refrigerant within the condenser 14 is cooled by circulation of air over the condenser and is liquefied, and the liquid refrigerant flows from the condenser 14 to the receiver 15 through a connection 24. When a predetermined amount of liquid refrigerant has collected in the receiver 15 a float therein rises and allows the refrigerant to flow from the chamber 15 through the liquid line 17 into a conduit 25 of the evaporator 16. The liquid refrigerant within the evaporator 16 is vaporized by the absorption of heat from the air within the compartment 12 and the vaporized refrigerant is withdrawn from the evaporator through the suction line 18 and thereby returned to casing 13.

During the active periods of operation of the refrigerating machine liquid and gaseous refrigerant are continuously circulated through the evaporator conduit which, therefore, operates as an evaporator of the non-flooded type. However, when the refrigerating machine is stopped there is a tendency for the liquid refrigerant in the evaporator to collect at the lower end thereof during the inactive periods of the machine and thereby make the heat-absorbing capacity greater in the lower than in the upper portion of the evaporator. It is therefore desirable to provide some arrangement for preventing the accumulation of all the refrigerant at one end of the evaporator in such a manner as to concentrate the heat-absorbing capacity in one portion of the evaporator. In order to distribute evenly the heat-absorbing capacity of the evaporator I provide a plurality of pockets or reservoirs to trap small amounts of liquid refrigerant throughout the length of the evaporator so that during the idle period liquid refrigerant is available in substantially all parts of the heat transfer wall of the evaporator and heat may be absorbed uniformly through out the area thereof.

As shown in Figs. 2 and 3, evaporator 16 comprises front and back metal sheet portions or elements 26 and 27 respectively. The sheet 26 is provided with identations stamped or embossed therein and forming the conduit 25 and a plurality of small reservoirs 28 comprising a series of substantially identical enlargements of the conduit arranged at intervals along the conduit and extending downwardly therefrom. The pair of sheets 26 and 27 are then secured together by welding, brazing or in any other suitable manner to provide a pressure-tight evaporator. When the evaporator is connected in the circuit of the refrigerating machine, the liquid line 17 is connected to the end of the evaporator at the upper end thereof as indicated at 29 and the suction line 18 is connected at the lower end as indicated at 30.

During operation of the evaporator 16, liquid and gaseous refrigerant are admitted to the upper end of the conduit 25 and flow downwardly through the conduit, portions of the liquid refrigerant being vaporized and the vaporized refrigerant being withdrawn from the evaporator at the lower end of the conduit through suction line 18. The conduit 25 is made of sufficient cross-sectional area that the streams of gaseous refrigerant may flow therethrough over the pools of liquid refrigerant without forcing the liquid refrigerant to pass in slugs through the conduit. Liquid refrigerant is therefore trapped and retained in each of the reservoirs 28 and there is liquid refrigerant throughout the entire area of the evaporator which is capable of absorbing heat from the air passing over the surface of the evaporator. Furthermore, any oil or lubricant flowing into the evaporator with the refrigerant will tend to float on the surface of the refrigerant in the reservoirs and be carried along with the gaseous refrigerant. Reservoirs 28 therefore afford ready removal of lubricant from the evaporator. During the idle periods of the refrigerating machine when refrigerant is not being supplied to the evaporator, small amounts of liquid refrigerant are maintained in the reservoirs and are available through the length of the conduit 25 for absorbing heat, and there is, therefore, a uniform distribution of the heat-absorbing capacity of the evaporator during the inactive or idle periods of the refrigerating machine.

In Figs. 4, 5, and 6 I have shown another embodiment of my invention. The evaporator shown in Fig. 4 comprises an air cooling portion or heat transfer wall 31 and a freezing tray shelf or heat transfer wall 32 at right angles thereto. The shelf 32 is provided with end pieces 33 whereby the evaporator may be secured within a refrigerator cabinet. The air cooling portion 31 is provided with a refrigerant header 34 and a depending refrigerant circulating conduit 35 communicating at both ends with the header. The header 34 is maintained normally about half filled with liquid refrigerant and the conduit 35 is thereby maintained flooded. The freezing shelf 32 is provided with a sinuous refrigerant circulating conduit 36 and at intervals along the conduit 36 are provided pockets or reservoirs 37 extending downwardly therefrom and in communication therewith. The reservoirs 37 perform the same function as the reservoirs 28 shown on the evaporator of Fig. 1, and the shelf conduit thus operates as an evaporator of the non-flooded type.

During the operation of the evaporator shown in Fig. 4, liquid refrigerant is admitted to the evaporator from a liquid line 38 and flows through a shelf inlet conduit 39 formed in the evaporator and thence into the shelf conduit 36. Part of the liquid refrigerant is trapped in the reservoirs 37 below the path of gaseous refrigerant and the remainder flows with the stream of gaseous refrigerant from conduit 36 through a shelf outlet connection 40 and into the lower end of the passage 35. A circulation of the refrigerant in the passage 35 is produced by the refrigerant admitted thereto from the conduit 40. Gaseous refrigerant is withdrawn from the header above the level of liquid refrigerant therein through a suction line 41. During the idle periods of the refrigerating machine when no refrigerant is being admitted to the evaporator from the line 38 the liquid refrigerant trapped in the reservoirs 37 is available for cooling articles such as freezing trays placed on the shelf 32.

From the foregoing it is evident that I have provided a simple and effective arrangement for maintaining even distribution of refrigerant throughout the passages of an evaporator during both the active and inactive periods of the refrigerating machine.

While I have shown and described my invention in connection with a household refrigerating machine, other applications will readily be apparent to those skilled in the art. I do not therefore desire my invention to be limited to the particular embodiments shown and described and I intend in the appended claims to cover all modifications within the spirit and scope of my invention.

What I claim as new and desire to secure by Letters Patent of the United States is:

1. An evaporator of the non-flooded type for a refrigerating machine including a sheet metal wall having a sinuous conduit formed therein, means for supplying liquid refrigerant to said conduit during the active periods of operation of said machine, and means including a plurality of small reservoirs formed at intervals along said conduit for trapping liquid refrigerant therein to maintain portions of liquid refrigerant distributed along said conduit during the inactive periods of said machine to provide substantially uniform heat absorbing capacity throughout the length of said conduit.

2. An evaporator of the non-flooded type for a refrigerating machine comprising sheet metal portions, at least one of said portions having indentations therein forming a sinuous refrigerant conduit, means for supplying liquid refrigerant to said conduit during the active periods of operation of said machine, and means including a plurality of indentations formed in one of said sheets at intervals along said conduit for trapping small quantities of liquid refrigerant therein and for maintaining liquid refrigerant distributed along said conduit during the inactive periods of said machine to provide substantially uniform heat absorbing capacity throughout the length of said conduit.

3. An evaporator of the non-flooded type for a refrigerating machine comprising sheet metal portions providing a wall to be cooled, means including an indentation in at least one of said sheet metal portions for providing an extended refrigerant circulating conduit to cool said wall, means for supplying liquid refrigerant to said conduit during the period of operation of said machine, and means including a plurality of small reservoirs formed in one of said metal portions and extending downwardly from and in communication with said conduit at intervals along the length thereof for trapping liquid refrigerant and for maintaining liquid refrigerant distributed along said conduit during the inactive periods of said machine to provide substantially uniform heat absorbing capacity throughout the length of said conduit.

4. An evaporator comprising a pair of elements of sheet material secured together to provide a heat transfer wall, an inlet for receiving liquid refrigerant and an outlet for vaporized refrigerant; said evaporator having a conduit embossed in the material and extending back and forth across a face of said wall and connected to said inlet and said outlet, said conduit being enlarged at spaced intervals from said inlet to said outlet to provide a series of substantially identical reservoirs for trapping and retaining quantities of refrigerant in pools below the path of, and in communication with, the streams of gaseous refrigerant flowing towards said outlet.

CHRISTIAN STEENSTRUP.